US008235879B2

(12) United States Patent
Tsuchiya et al.

(10) Patent No.: US 8,235,879 B2

(45) Date of Patent: Aug. 7, 2012

(54) CHARGING ROLL

(75) Inventors: Kenichi Tsuchiya, Komaki (JP); Naoaki Sasakibara, Komaki (JP); Fumio Misumi, Komaki (JP); Satoshi Suzuki, Inuyama (JP); Kadai Takeyama, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 893 days.

(21) Appl. No.: 12/141,369

(22) Filed: Jun. 18, 2008

(65) Prior Publication Data

US 2009/0005225 A1 Jan. 1, 2009

(30) Foreign Application Priority Data

Jun. 25, 2007 (JP) ................................ 2007-165875
May 23, 2008 (JP) ................................ 2008-134993

(51) Int. Cl.
*F16C 13/00* (2006.01)

(52) U.S. Cl. ................. 492/56; 492/53; 492/48; 492/59

(58) Field of Classification Search .................... 492/56, 492/53, 59, 48
See application file for complete search history.

(56) References Cited

U.S. PATENT DOCUMENTS 5,733,235 A 3/1998 Waku et al.
5,804,309 A * 9/1998 Itoh et al. ...................... 428/375
6,004,669 A * 12/1999 Rokutan et al. ............... 428/335
6,343,199 B1 * 1/2002 Kodama ....................... 399/174
6,523,263 B2 * 2/2003 Jo et al. ...................... 29/895.32
6,697,591 B2 * 2/2004 Morikawa et al. ............ 399/159
6,806,009 B2 * 10/2004 Tanaka et al. .................. 430/66
6,815,135 B2 * 11/2004 Morikawa et al. .............. 430/66
6,897,001 B2 * 5/2005 Mizoe et al. ............... 430/108.6
6,942,607 B2 * 9/2005 Jo et al. .......................... 492/56
7,226,282 B2 * 6/2007 Jo et al. .......................... 425/4 R
7,291,663 B2 * 11/2007 Hattori et al. ................. 524/168
7,537,717 B2 * 5/2009 Noda et al. .................. 264/46.9
7,544,158 B2 * 6/2009 Yamada et al. ................. 492/56
7,609,999 B2 * 10/2009 Gila et al. ..................... 399/176
2001/0002382 A1 * 5/2001 Jo et al. .......................... 492/56
2003/0060348 A1 * 3/2003 Jo et al. .......................... 492/56
2003/0125177 A1 * 7/2003 Jo et al. .......................... 492/56
2003/0139270 A1 * 7/2003 Jung et al. ....................... 492/56
2003/0236330 A1 * 12/2003 Hattori et al. ................. 524/155

(Continued)

FOREIGN PATENT DOCUMENTS

JP 07028301 A * 1/1995

(Continued)

OTHER PUBLICATIONS

Machine English translation of JP 2002-053705A.*

(Continued)

*Primary Examiner* — Essama Omgba
(74) *Attorney, Agent, or Firm* — Burr & Brown

(57) ABSTRACT

A charging roll includes a shaft and an ionically conductive elastic layer formed around the shaft. The ionically conductive elastic layer is formed of a rubber composition free of any electron-conductive agent and containing 0.7 to 1.0 parts by weight of a peroxide cross-linking agent per 100 parts by weight of an ion-conductive rubber. The ion-conductive rubber is formed of at least one of an epichlorohydrin rubber and a nitrile rubber, and a percentage of a rubber component in the ionically conductive elastic layer measured by thermogravimetric analysis is 90% or more by weight.

1 Claim, 1 Drawing Sheet

U.S. PATENT DOCUMENTS

| | | | | |
|---|---|---|---|---|
| 2005/0029693 | A1* | 2/2005 | Noda et al. | 264/46.9 |
| 2006/0056879 | A1* | 3/2006 | Jung et al. | 399/239 |
| 2006/0252619 | A1* | 11/2006 | Yamada et al. | 492/56 |

FOREIGN PATENT DOCUMENTS

| | | | | |
|---|---|---|---|---|
| JP | 08-292640 | A | | 11/1996 |
| JP | 2001005262 | A | * | 1/2001 |
| JP | 2001-248630 | A | | 9/2001 |
| JP | 2001-273815 | A | | 10/2001 |
| JP | 2002053705 | A | * | 2/2002 |
| JP | 2002132020 | A | * | 5/2002 |
| JP | 2004-002661 | A | | 1/2004 |
| JP | 2004210415 | A | * | 7/2004 |
| JP | 2004-258277 | A | | 9/2004 |
| JP | 3724465 | B2 | | 9/2005 |
| JP | 2005344102 | A | * | 12/2005 |
| JP | 2006-098755 | A | | 4/2006 |
| JP | 2006-309063 | A1 | | 11/2006 |

OTHER PUBLICATIONS

Machine English translation of JP 2002-132020 A.*

Japanese Notice of Allowance, Japanese Document No. 2008-134993, dated Jun. 19, 2012 (3 pages).

* cited by examiner

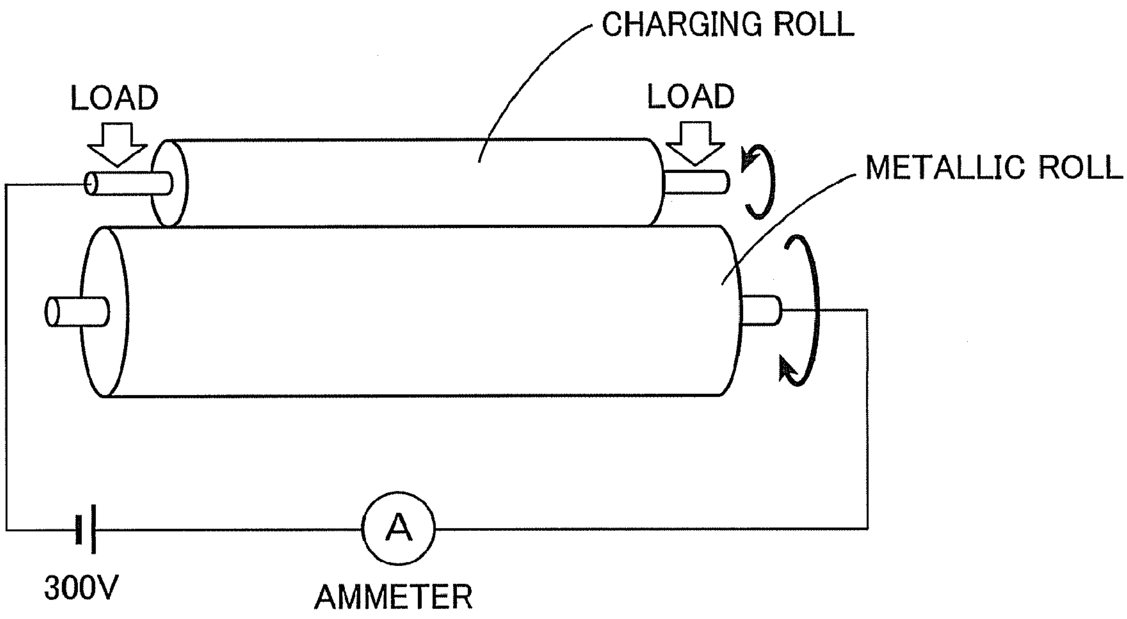
CHARGING ROLL
LOAD
LOAD
METALLIC ROLL
300V
A
AMMETER

CHARGING ROLL

The present application is based on Japanese Patent Application Nos. 2007-165875 and 2008-134993 filed on Jun. 25, 2007 and May 23, 2008, respectively, the contents of which are incorporated herein by reference.

BACKGROUND OF THE INVENTION

1. Field of the Invention

The present invention relates to a charging roll for use in an image forming apparatus such as an electrophotographic copier, printer, or facsimile machine. In particular, the invention is concerned with such a charging roll for charging an image bearing medium such as a photoconductive or photosensitive medium used in electrophotography, and a dielectric medium used in electrostatic recording.

2. Description of the Related Art

In an image forming apparatus such as electrophotographic copier, printer, or facsimile machine, a so-called roll charging method has been widely adopted, in which an image bearing medium such as a photosensitive drum and a charging roll are mutually rotated, while the image bearing medium is held in contact with an outer circumferential surface of the charging roll, thereby charging the surface of the image bearing medium.

As charging rolls for use in the roll charging method, which is a kind of contact charging method, charging rolls with various structures have been conventionally suggested and used. Examples of conventional charging rolls include a charging roll with a structure in which a conductive elastic layer formed of a rubber layer having a low hardness is provided around a conductive shaft (metal core), and furthermore, a resistance adjusting layer and a protective layer are sequentially laminated on an outer circumferential surface of the conductive elastic layer as needed.

The conductive elastic layer of the charging roll having the above-described structure is conventionally formed of a rubber composition containing natural rubber or various synthetic rubbers with various additives including an electron-conductive agent such as carbon black. Specifically, with such a rubber composition being used as a molding material, the conductive elastic layer is obtained by a process including the steps of forming an unvulcanized (non-cross-linked) rubber composition layer having a predetermined thickness around the shaft according to various molding method, and vulcanizing or cross-linking the rubber composition layer.

The conductive elastic layer described above is required to be excellent in resistance to permanent set and charging uniformity and also required to have the lowest possible hardness, so as to allow the charging roll to efficiently charge the surface of the image bearing medium and to surely contact with the image bearing medium.

In recent years, a rubber composition including an ion-conductive rubber such as an epichlorohydrin rubber, as a rubber component, has come into use in the production of the conductive elastic layer of the charging roll. When molding is performed according to a conventional injection molding method by using such a rubber composition, the resultant molded body (an unvulcanized (non-cross-linked) rubber composition layer) may suffer from problems such as a poor surface property. To avoid the problems, an extrusion molding method has been widely adopted when molding a rubber composition including an ion-conductive rubber as a rubber component. In addition, in the above-described rubber composition, an inorganic filler such as calcium carbonate or silica is generally included in order to ensure moldability in extrusion molding and to facilitate grinding of the final vulcanized product (cross-linked product), as disclosed in Japanese Patent No. 3724465.

However, in the conductive elastic layer obtained by performing the extrusion molding and vulcanizing (cross-linking) the rubber composition that includes an inorganic filler such as calcium carbonate or silica, there is a problem in which the presence of the filler inevitably increases the hardness of the conductive elastic layer, and ultimately, it increases the hardness of the entire charging roll. In order to solve this problem, a rubber composition including liquid polymer have been used to form a conductive elastic layer, for example. However, in recent years, there is demand for miniaturization and higher-performance of image forming apparatuses such as electrophotographic copiers, and consequently, the charging roll are also required to have more improved characteristics. As a result, it is desired to develop a charging roll that has a low hardness with excellent resistance to permanent set and that is also capable of advantageously achieving required conductivity.

SUMMARY OF THE INVENTION

The present invention has been made in the light of the situation described above. It is therefore an object of the invention to provide a charging roll that has a low hardness with excellent resistance to permanent set and that is also capable of advantageously achieving required conductivity.

The inventors of the present invention made an extensive study on a rubber composition having an epichlorohydrin rubber and/or a nitrile rubber (NBR) as an ion-conductive rubber, and the inventors have found that a charging roll having a conductive elastic layer formed of a rubber composition with predetermined composition can entirely solve the above problem, and have accomplished the present invention.

It is therefore an object of the present invention to provide a charging roll comprising a shaft and an ionically conductive elastic layer formed around the shaft, wherein the ionically conductive elastic layer is formed of a rubber composition free of any electron-conductive agent and containing 0.7 to 1.0 parts by weight of a peroxide cross-linking agent per 100 parts by weight of an ion-conductive rubber, the ion-conductive rubber being formed of at least one of an epichlorohydrin rubber and a nitrile rubber, and wherein a percentage of a rubber component in the conductive elastic layer measured by thermogravimetric analysis is 90% or more by weight.

According to a preferred aspect of the charging roll according to the present invention, the ion-conductive rubber forming the rubber composition is the epichlorohydrin rubber, the rubber composition further containing 0.5 parts by weight or less of an ion-conductive agent per 100 parts by weight of the epichlorohydrin rubber.

According to a preferred aspect of the charging roll according to the present invention, the ion-conductive rubber forming the rubber composition is the nitrile rubber, the rubber composition further containing 1 to 2 parts by weight of an ion-conductive agent per 100 parts by weight of the nitrile rubber.

Furthermore, in the above-described charging roll according to the present invention, it is preferable that the ionically conductive elastic layer is formed by a process comprising the steps of: (a) placing the shaft on a center axis of a mold having a cylindrical cavity, (b) injecting the rubber composition into the mold to form a layer, and (c) peroxide-cross-linking the layer.

As described above, in the charging roll according to the present invention, the ionically conductive elastic layer is formed by cross-linking the rubber composition that is formed by combining the predetermined ion-conductive rubber with the peroxide cross-linking agent. In addition, the conductive layer is formed of a cross-linked product in which the percentage of a rubber component measured by thermogravimetric analysis is 90% or more by weight. Therefore, compared with a conventional charging roll having a conductive elastic layer formed of rubber composition including an inorganic filler such as silica, the charging roll according to the present invention has a lower hardness with excellent resistance to permanent set.

In addition, the ionically conductive elastic layer of the charging roll according to the present invention is formed through peroxide-cross-linking which use peroxide as a cross-linking agent in place of sulfur vulcanization that has been widely performed conventionally. It greatly contributes to the achievement of excellent resistance to permanent set that the ionically conductive elastic layer is formed through peroxide-cross-linking.

The ionically conductive elastic layer of the charging roll according to the present invention is formed of a rubber composition including an epichlorohydrin rubber and/or a nitrile rubber, which is an ion-conductive rubber, as a rubber component. The epichlorohydrin rubber and the nitrile rubber have a relatively small volume resistivity for a rubber, whereby conductivity required as a charging roll can be advantageously exhibited.

When better conductivity is required for the ionically conductive elastic layer, the ionically conductive elastic layer can be formed of a rubber composition that includes an ion-conductive agent. Specifically, when only an epichlorohydrin rubber is used as the ion-conductive rubber, the ionically conductive elastic layer is formed of a rubber composition including 0.5 parts by weight or less of the ion-conductive agent per 100 parts by weight of the epichlorohydrin rubber. When only a nitrile rubber is used, the ionically conductive elastic layer is formed of a rubber composition including 1 to 2 parts by weight of the ion-conductive agent per 100 parts by weight of the nitrile rubber. In this way, improvement of conductivity can be advantageously achieved.

The conventional conductive elastic layer formed of a rubber composition that includes conductive carbon black is required to be chamfered at its axially opposite ends in order to prevent current leakage between the conductive elastic layer and the surface of the image bearing medium. In contrast, the ionically conductive elastic layer of the charging roll according to the present invention includes an ion-conductive rubber as a rubber component, and does not contain any electron-conductive agent such as conductive carbon black, whereby the ionically conductive elastic layer of the charging roll according to the present invention does not require to be chamfered, which has been conventionally required.

Of the charging rolls according to the present invention, particularly, the charging roll formed by the following steps can surely achieve the above-described excellent characteristics. That is, the ionically conductive elastic layer is formed by a process including the steps of placing a shaft on a center axis of a mold having a cylindrical cavity, injecting the rubber composition into the mold to form a layer, and peroxide-cross-linking the layer. In addition, the thus obtained charging roll has a remarkable surface property, namely smoothness, in the conductive elastic layer. Therefore, a grinding or polishing process after cross-linking (vulcanization) is not required, which is required for the conductive elastic layer formed by using a conventional rubber composition.

BRIEF DESCRIPTION OF THE DRAWING

The above and other objects, features, advantages and technical and industrial significance of the present invention will be better understood by reading the following detailed description of presently preferred embodiments of the invention, when considered in connection with the accompanying drawings, in which:

FIG. 1 is a view showing a method for measuring a resistance value of a charging roll (roll resistance), which is used in examples of the present invention.

DETAILED DESCRIPTION OF THE PREFERRED EMBODIMENT

In the production of the charging roll according to the present invention, initially, a shaft (metal core) made of a conductor having a predetermined length is provided and a rubber composition for forming an ionically conductive elastic layer on the shaft is prepared. In the preparation of such a rubber composition, an epichlorohydrin rubber and/or a nitrile rubber, which is an ion-conductive rubber, is used as a rubber component.

In the present invention, as an epichlorohydrin rubber, any one of an epichlorohydrin homopolymer, an epichlorohydrin-ethyleneoxide copolymer, and a copolymer obtained by copolymerizing the epichlorohydrin-ethyleneoxide copolymer and allyl glycidyl ether can be used, for example. In addition, two or more thereof can be used in combination.

Further, in the present invention, one or more of the above-described epichlorohydrin rubbers can be used together with a nitrile rubber (NBR), and still further a nitrile rubber can be solely used.

As a cross-linking agent for cross-linking the ion-conductive rubber such as an epichlorohydrin rubber, a peroxide cross-linking agent is employed in the present invention. The ion-conductive rubber is cross-linked with peroxide in place of sulfur, which has been widely used conventionally, whereby the resultant conductive elastic layer, and ultimately, the charging roll has excellent resistance to permanent set.

In the present invention, the peroxide cross-linking agent is included in the rubber composition in an amount of 0.7 to 1.0 parts by weight per 100 parts by weight of the ion-conductive rubber. If the amount of the peroxide cross-linking agent is less than 0.7 parts by weight, the ion-conductive rubber does not sufficiently cross-linked. As a result, the resultant ionically conductive elastic layer may not be able to achieve sufficient resistance to permanent set. On the other hand, if the amount of the peroxide cross-linking agent exceeds 1.0 parts by weight, the hardness of the ionically conductive elastic layer may be too high.

As the peroxide cross-linking agent for use in the present invention, any conventionally known one can be used. Specifically, examples of the peroxide cross-linking agents include: peroxiketal-based cross-linking agents such as PERHEXA HC, PERHEXA V, and PERHEXA C (product names: available from NOF Corporation); dialkylperoxide-based cross-linking agents such as PERHEXA 25B, PEROXYMON F, PERCUMYL D, PERBUTYL C, PERHEXYL D, and PERBUTYL D (product names: available from NOF Corporation); peroxiester-based cross-linking agents such as PERBUTYL E, PERBUTYL I, and PERBUTYL Z (product names: available from NOF Corporation); ketoneperoxide-based cross-linking agents; peroxidicarbonate-based cross-linking agents; diacylperoxide-based cross-linking agents; and hydroperoxide-based cross-linking agents. Among these known peroxide cross-linking agents, one or more are suitably selected as needed according to the purpose.

Both of the epichlorohydrin rubber and the nitrile rubber, which are the ion-conductive rubbers, have a relatively small volume resistivity for a rubber. However, if a charging roll having higher conductivity is desired, an ion-conductive agent is further added to the rubber composition including the ion-conductive rubber and the peroxide cross-linking agent.

If the amount of this ion-conductive agent is excessively small, no effect can be obtained. On the other hand, if the amount of the ion-conductive agent is excessively large, a significant improvement in conductivity cannot be achieved, and the bleeding and the like are more likely to be occurred. Accordingly, the amount of the ion-conductive agent is appropriately determined according to the desired conductivity and other requirements for the target charging roll. Preferably, when the rubber component forming the rubber composition is an epichlorohydrin rubber, 0.5 parts by weight or less of the ion-conductive agent is included in the rubber composition per 100 parts by weight of the epichlorohydrin rubber. When the rubber component forming the rubber composition is a nitrile rubber, it is preferable that 1 to 2 parts by weight of the ion-conductive agent is included in the rubber composition per 100 parts by weight of the nitrile rubber. Any conventional known ion-conductive agents may be used in the present invention. Examples of conventionally known ion-conductive agents include quaternary ammonium salts such as tributyl ethyl ammonium ethyl sulfate, tetrabutyl ammonium chloride, tetrabutyl ammonium bromide, tetrabutyl ammonium iodide, and tetrabutyl ammonium perchlorate; perchlorates such as lithium perchlorate and potassium perchlorate; and organic boron complex.

However, in the production of the ionically-conductive elastic layer of the charging roll according to the present invention, an electron-conductive agent such as conductive carbon black is not employed. This is because, when such conductive carbon black or the like is included in the rubber composition, the hardness of the resultant conductive elastic layer is increased, whereby a resistance to permanent set may be deteriorated.

As is apparent from the foregoing description, in the charging roll according to the present invention, the ionically conductive elastic layer thereof is formed of the rubber composition that does not include any electron-conductive agent such as conductive carbon black and include an ion-conductive rubber such as an epichlorohydrin rubber as a rubber component. In many cases, the conventional conductive elastic layer that is formed of a rubber composition including the electron-conductive agent is required to be chamfered at its axially opposite ends in order to prevent current leakage between the layer and the surface of the image bearing medium. In contrast, the ionically conductive elastic layer of the charging roll according to the present invention does not need to be chamfered.

As with the conventional rubber composition, in the production of the ionically conductive elastic layer of the charging roll according to the present invention, cross-linking aids, cross-linking accelerators, and other various additives can be added to the ion-conductive rubber and the peroxide cross-linking agent (and further to the ion-conductive agent as needed). However, these additives has to be added in an amount such that a percentage of a rubber component in the ionically conductive elastic layer, which is obtained by cross-linking the rubber composition, is to be 90% or more by weight when measured by thermogravimetric analysis (TG).

That is, in the charging roll according to the present invention, the ionically conductive elastic layer thereof is formed of a cross-linked product in which a rubber component measured by thermogravimetric analysis is present in an amount of 90% or more by weight. The amount of rubber component is lager than that of the conventional conductive elastic layer, whereby the charging roll has a lower hardness with excellent resistance to permanent set.

A percentage of a rubber component measured by thermogravimetric analysis is determined according to the following process.

Initially, two specimens are sampled from an ionically conductive elastic layer obtained by peroxide-cross-linking a rubber composition (or may be sampled from a cross-linked product obtained by cross-linking and molding a rubber composition having the same composition under the same conditions as the conductive elastic layer). A quantitative analysis of extractables (volatile constituents of a trace additive) is performed by using one of the specimens. Specifically, the process includes the steps of 1) measuring the weight of the specimen, 2) extracting the volatile constituents from the specimen according to a Soxhlet extraction in which acetone or the like is used as solvent (condition: at 80° C. for sixteen hours), 3) air-drying the specimen after the Soxhlet extraction is performed, and then placing and drying the specimen in a vacuum drier set at 70° C. overnight, and 4) determining the weight of the specimen after dried. An amount of the volatile constituents in the specimen (A (% by weight)) is calculated from the weights of the specimen that are measured before and after the extraction of the volatile constituents.

Meanwhile, the other sampled specimen is subjected to thermogravimetric analysis at a rate of temperature increase of 20° C. per minute by using a thermogravimeter (thermogravity analysis). In this analysis, the temperature is increased under a nitrogen atmosphere (in an airflow of nitrogen) from a room temperature to 600° C. and under an oxidized atmosphere (in an air airflow) from 600° C. to 900° C. It is considered that a decrease in weight under the nitrogen atmosphere is resulted from vaporization of the volatile constituents contained in the specimen and decomposition of the rubber component. It is also considered that a decrease in weight under the oxidized atmosphere is resulted from oxidative decomposition of carbon. In addition, residues after the temperature is increased to 900° C. are considered as ash. After the thermogravimetric analysis, from each decreased amount in weight, an amount (% by weight) of "volatile constituents and rubber component", "carbon", and "ash" is determined. Then, an amount of a rubber component (% by weight) is calculated by subtracting the amount of the volatile constituents in the specimen (A (% by weight)), which was calculated separately, from the amount of "volatile constituents and rubber component" which was determined through thermogravimetric analysis.

In the production of the charging roll according to the present invention, a rubber composition layer (an ionically conductive elastic layer before cross-linking) is formed around a shaft (metal core) according to, advantageously, injection molding method by using the rubber composition described above. Specifically, a shaft (metal core) is disposed on a center axis of a mold having a cylindrical cavity and, in that state, the rubber composition is injected in the mold to form a rubber composition layer around the shaft (metal core). Then, the rubber composition layer is subjected to a cross-linking operation to obtain the charging roll according to the present invention. The above-obtained charging roll has an excellent surface property, namely smoothness, in its ionically conductive elastic layer. Conditions in injection molding and temperature conditions in cross-linking are suitably selected according to the composition of the rubber composition and others.

On the surface of the charging roll (outer circumferential surface of the ionically conductive elastic layer), a protective layer is further formed as needed. This protective layer is provided for preventing toner or the like from adhering to and accumulating on the surface of the charging roll. The protective layer is formed, for example, by mixing any resin composition material including fluorine resin such as fluorine denatured acrylate resin or a nylon material such as N-methoxymethylated nylon with a conductive agent such as carbon black or a metal oxide such that the protective layer has a volume resistivity, in general, in a range from about $1\times10^5$ to $1\times10^{13}\Omega\cdot$cm. The protective layer is formed by a known coating method such as dipping, and the thickness of the protective layer is suitably determined according to the size (diameter or length) of the charging roll. Generally, the thickness of the protective layer is held in a range from about 1 to 20 μm.

Furthermore, in the conventional charging roll, between the conductive elastic layer and the above-described protective layer, a resistance adjustment layer is generally provided for controlling electric resistance of the entire charging roll to increase the withstand voltage (the resistance to current leakage). The charging roll according to the present invention, however, does not need such a resistance adjusting layer in general since the ionically conductive elastic layer contains an ion-conductive rubber as a rubber component.

In the charging roll obtained according to the forgoing description, the conductive elastic layer thereof has a low hardness with excellent resistance to permanent set.

EXAMPLES

To further clarify the principle of the present invention, several examples of the present invention will be described below. However, it is to be understood that the invention is by no means limited to the details of these examples, but may be embodied with various changes, modifications and improvements which may occur to those skilled in the art, without departing from the scope of the present invention.

Initially, sixteen rubber compositions each having composition shown in Table 1 and Table 2 (rubber compositions Nos. 1 to 16) were prepared. In the preparation, EPICHLOMER CG102 (product name) available from DAISO CO., LTD. was used as epichlorohydrin rubber, NIPOL 3335 (product name) available from ZEON CORPORATION was used as a nitrile rubber, DHT-4A (product name) available from Kyowa Chemical Industry Co., Ltd. was used as a hydrotalcite, which functions as an antacid agent, a dicumyl peroxide (product name: PERCUMYL D available from NOF Corporation) was used as an peroxide cross-linking agent, and quaternary ammonium salt was used as an ion-conductive agent. In addition, in Table 1 and Table 2 below, vulcanization accelerator A is Sanceler CZ (product name) available from SANSHIN CHEMICAL INDUSTRY CO., LTD., vulcanization accelerator B is NOCCELER TRA (product name) available from OUCHI SHINKO CHEMICAL INDUSTRIAL CO., LTD., and vulcanization accelerator C is NOCCELER TT (product name) available from OUCHI SHINKO CHEMICAL INDUSTRIAL CO., LTD.

TABLE 1

| | | Rubber composition No. | | | | | | | |
|---|---|---|---|---|---|---|---|---|---|
| | | 1 | 2 | 3 | 4 | 5 | 6 | 7 | 8 |
| Parts by weight | Epichlorohydrin rubber | 100 | 100 | 100 | 100 | 100 | — | 100 | 100 |
| | Nitrile rubber | — | — | — | — | — | 100 | — | — |
| | Stearic acid | 0.7 | 0.7 | 0.7 | 0.7 | 0.7 | 1.0 | 0.7 | 0.7 |
| | Zinc oxide | 5.0 | 5.0 | 5.0 | 5.0 | 5.0 | 5.0 | 5.0 | 5.0 |
| | Hydrotalcite | 2.0 | 2.0 | 2.0 | 2.0 | 2.0 | — | 2.0 | 2.0 |
| | PERCUMYL D | 0.8 | 0.8 | 1.0 | 0.8 | 0.8 | 1.0 | 0.7 | 1.0 |
| | Sulfur | — | — | — | — | — | — | — | — |
| | Vulcanization accelerator A | — | — | — | — | — | — | — | — |
| | Vulcanization accelerator B | — | — | — | — | — | — | — | — |
| | Vulcanization accelerator C | — | — | — | — | — | — | — | — |
| | Ion-conductive agent | — | 0.3 | 0.3 | 0.4 | 0.8 | 1.0 | 0.3 | 0.3 |
| | Calcium carbonate | — | — | — | — | — | — | — | 4.5 |

TABLE 2

| | | Rubber composition No. | | | | | | | |
|---|---|---|---|---|---|---|---|---|---|
| | | 9 | 10 | 11 | 12 | 13 | 14 | 15 | 16 |
| Parts by weight | Epichlorohydrin rubber | 100 | — | 100 | 100 | — | 100 | 100 | 100 |
| | Nitrile rubber | — | 100 | — | — | 100 | — | — | — |
| | Stearic acid | 0.7 | 1.0 | 0.7 | 0.7 | 1.0 | 0.7 | 0.7 | 0.7 |
| | Zinc oxide | 5.0 | 5.0 | 5.0 | 5.0 | 5.0 | 5.0 | 5.0 | 5.0 |
| | Hydrotalcite | 2.0 | 2.0 | 2.0 | 2.0 | — | 2.0 | 2.0 | 2.0 |
| | PERCUMYL D | 0.8 | 0.8 | 0.8 | — | — | 0.8 | 0.6 | 1.2 |
| | Sulfur | — | — | — | 0.5 | 0.5 | — | — | — |
| | Vulcanization accelerator A | — | — | — | 0.3 | 0.5 | — | — | — |
| | Vulcanization accelerator B | — | — | — | 0.7 | 0.5 | — | — | — |
| | Vulcanization accelerator C | — | — | — | 0.5 | — | — | — | — |
| | Ion-conductive agent | 0.5 | 2.0 | 1.5 | — | 1.0 | 0.8 | 0.3 | 0.3 |
| | Calcium carbonate | — | — | — | — | — | 20 | — | — |

Each of the thus prepared sixteen rubber compositions was evaluated in terms of the following physical properties according to respective processes. The measurement results are shown in Table 3 and Table 4 below as material characteristics.

—A Rubber Fraction—

By using the cross-linked products (vulcanized products) as specimens, which were obtained by cross-linking (vulcanizing) each of the rubber compositions, a percentage of a rubber component (rubber fraction) in each of the specimens was calculated after performing a thermogravimetric analysis according to the above-described process.

—A Compression Set—

Each rubber composition was subjected to press cross-linking (vulcanization) molding at 160° C. for thirty minutes to obtain a sample of cross-linked product (vulcanized product) having a predetermined shape. A compression set (%) was measured by using the obtained sample in conformity with JIS-K-6262.

—A Volume Resistivity—

Each rubber composition was subjected to press cross-linking (vulcanization) molding at 160° C. for thirty minutes to obtain a sheet-like sample having a thickness of 2 mm. Silver paste was applied to one surface of the obtained sheet-like sample to provide an electrode of 10 mm×10 mm (equipped with a guard electrode). On a surface opposite to the surface provided with the electrode, an opposite electrode was provided. Then, the resistance between the electrodes under the applied voltage of 100 V was measured in conformity with JIS-K-6911 to calculate a volume resistivity (Ω·cm).

Next, charging rolls were produced by using the obtained rubber compositions according to the following process.

A mold having a predetermined cylindrical cavity was provided and a shaft (metal core) was disposed on a center axis of the mold. Then a rubber composition was injected in the mold. Thereafter, an ionically conductive elastic layer was formed on the outer circumferential surface of the metal core by a predetermined cross-linking (vulcanization) operation. Furthermore, the surface of the ionically conductive elastic layer was subjected to spray coating with resin liquid for forming a protective layer and dried. The resin liquid contains 100 parts by weight of N-methoxymethylated nylon and 8 parts by weight of conductive carbon black. In this manner, by using each rubber composition, there was produced a charging roll which has a ionically conductive elastic layer (having a thickness of 3 mm) around the metal core (having a diameter of 6 mm) and has a protective layer (having a thickness of 10 μm) on the surface of the ionically conductive elastic layer.

The thus obtained charging rolls including each of the rubber compositions were measured and evaluated for various physical properties. Such evaluations and measurements of the physical properties were each performed according to the following process, and the results of the evaluations (measurements) are shown in Table 3 and Table 4 below as roll evaluation.

—A Micro Rubber Hardness—

A spring-type hardness tester adopting a loading method with a cantilever shaped leaf spring (Micro durometer MD-1 type available from Kobunshi Keiki Co., Ltd.) was used for measurement. Described in detail, the tip of an indentor of the spring-type hardness tester was brought into contact with the surface of each charging roll at its axially middle portion while the charging roll was supported by V-blocks at its axially opposite ends such that the roll extends in the horizontal direction. Then, a load of 33.85 g was applied to the tester in the vertical direction. Immediately after the application of the load, the hardness of each charging roll was measured by reading the scale of the tester.

—A Roll Resistance—

As shown in FIG. 1, the metallic roll was rotated in a direction indicated by an arrow in the drawing at a predetermined rotating speed while the charging roll was held in pressing contact with the metallic roll (having a diameter of 24 mm) at its opposing ends by a predetermined load, thereby rotating the charging roll together. With this state being maintained (while the metallic roll and the charging roll are being rotated together), a voltage of 300 V was applied between an end of the charging roll and an end of the metallic roll. Then, a flowing current value was measured to determine an electric resistance value (roll resistance Ω).

—A Resistance to Permanent Set—

The produced charging roll was placed on the metallic roll (having a diameter of 24 mm), and a load of 500 g was applied to each of the axially opposite ends of the shaft (metal core) of the charging roll. The charging roll was left in this state under an atmosphere of a temperature of 40° C. and a humidity of 95% for two weeks. Then, the charging roll was removed from this atmosphere, and was left at room temperature for thirty minutes. Thereafter, a depth of concave (mm) occurred on the surface of the charging roll was measured, and the measured result was taken as a permanent set amount. In addition, the charging roll was installed on an actual machine (product name: CNJ3000 available from Hewlett-Packard Japan, Ltd.) and a predetermined image (test pattern) was output. The output image was visually observed to evaluate a resistance to permanent set based on the presence or absence of any deformed streak caused by a concave (permanent set) of the charging roll. Evaluation criteria are as follows.

Good: No deformed streak was observed in the output image.

Poor: A deformed streak was observed in the output image.

—A Resistance to Adhesion of Toner—

The produced charging roll was installed on an actual machine (product name: DocuPrint C3530 available from Fuji Xerox Co., Ltd.) and a printing test for 500 sheets was performed under an environment of a temperature of 32.5° C. and a humidity of 83% (based on 5% toner coverage). Then, the charging roll was removed from the actual machine, and a state of adhesion of toner or additive on the surface thereof was visually observed for evaluation. Evaluation criteria are as follows.

Good: Little adhesion of the toner or additive was observed on the surface of the charging roll.

Average: Slight adhesion of the toner or additive was observed on the surface of the charging roll.

Poor: A large amount of adhesion of the toner or additive was observed on the surface of the charging roll, so as to significantly affect the image.

—Evaluation of Bleeding—

The produced charging roll was left under an atmosphere of a temperature of 50° C. and a humidity of 90% for two weeks. Then, the surface of the charging roll was visually observed to confirm if there is any bleeding or not. Thereafter, the charging roll was installed on an actual machine (product name: CNJ3000 available from Hewlett-Packard Japan, Ltd.) and a predetermined image (test pattern) was output to visually observe the output image. Evaluation of bleeding was performed based on the result of the observation of the surface of the charging roll before the image was output and the result of the observation of the output image. Evaluation criteria are as follows.

Good: No bleeding was observed on the surface of the charging roll and no defects were observed in the output image.

Average: Bleeding was observed on the surface of the charging roll, but no defects were observed in the output image.

Poor: Bleeding was observed on the surface of the charging roll and defects were observed in the output image.

TABLE 3

| | | Rubber composition No. | | | | | | | |
|---|---|---|---|---|---|---|---|---|---|
| | | 1 | 2 | 3 | 4 | 5 | 6 | 7 | 8 |
| Material characteristics | Rubber fraction [% by weight] | 94 | 94 | 94 | 94 | 94 | 95 | 94 | 90 |
| | Compression set [%] | 3.4 | 3.9 | 4.0 | 3.8 | 3.6 | 9.0 | 9.3 | 9.5 |
| | Volume resistivity [Ω · cm] | $1.0 \times 10^8$ | $1.8 \times 10^7$ | $1.3 \times 10^7$ | $8.3 \times 10^6$ | $5.2 \times 10^6$ | $4.2 \times 10^7$ | $1.4 \times 10^7$ | $6.4 \times 10^7$ |
| Roll evaluation | Micro rubber hardness [°] | 43 | 43 | 58 | 43 | 43 | 47 | 40 | 60 |
| | Roll resistance [Ω] | $4.0 \times 10^6$ | $5.2 \times 10^5$ | $5.1 \times 10^5$ | $3.3 \times 10^5$ | $9.0 \times 10^4$ | $5.1 \times 10^6$ | $5.0 \times 10^5$ | $5.3 \times 10^5$ |
| | Permanent set [μm] | 2.1 | 2.0 | 1.3 | 2.0 | 2.1 | 2.5 | 2.6 | 2.9 |
| | Evaluation of resistance to permanent set | Good | Good | Good | Good | Good | Good | Good | Good |
| | Evaluation of resistance to adhesion of toner | Good | Good | Average | Good | Good | Good | Good | Good |
| | Evaluation of bleeding | Good | Good | Good | Good | Average | Good | Good | Good |

TABLE 4

| | | Rubber composition No. | | | | | | | |
|---|---|---|---|---|---|---|---|---|---|
| | | 9 | 10 | 11 | 12 | 13 | 14 | 15 | 16 |
| Material characteristics | Rubber fraction [% by weight] | 94 | 94 | 94 | 93 | 95 | 80 | 94 | 94 |
| | Compression set [%] | 3.7 | 5.2 | 3.9 | 28 | 36 | 4.2 | 4.4 | 3.5 |
| | Volume resistivity [Ω · cm] | $7.5 \times 10^6$ | $9.8 \times 10^6$ | $3.4 \times 10^6$ | $1.8 \times 10^8$ | $4.2 \times 10^7$ | $1.7 \times 10^7$ | $1.5 \times 10^7$ | $1.3 \times 10^7$ |
| Roll evaluation | Micro rubber hardness [°] | 43 | 43 | 44 | 36 | 43 | 45 | 38 | 64 |
| | Roll resistance [Ω] | $3.0 \times 10^5$ | $4.9 \times 10^5$ | $5.0 \times 10^4$ | $4.8 \times 10^6$ | $5.0 \times 10^6$ | $4.9 \times 10^5$ | $5.0 \times 10^5$ | $4.9 \times 10^5$ |
| | Permanent set [μm] | 2.0 | 2.2 | 2.3 | 8.0 | 11.0 | 3.9 | 3.5 | 1.1 |
| | Evaluation of resistance to permanent set | Good | Good | Good | Poor | Poor | Poor | Poor | Good |
| | Evaluation of resistance to adhesion of toner | Good | Good | Good | Good | Good | Good | Good | Poor |
| | Evaluation of bleeding | Good | Good | Average | Good | Good | Average | Good | Good |

As apparent from the results in Table 3 and Table 4, the charging roll according to the present invention (any of the charging rolls in which conductive elastic layer is formed by using rubber compositions Nos. 1 to 11) has a low hardness with excellent resistance to permanent set, and is also capable of advantageously exhibiting required conductivity by changing the amount of the ion-conductive agent to be included.

What is claimed is:

1. A charging roll comprising a shaft and an ionically conductive elastic layer formed around the shaft, wherein the ionically conductive elastic layer is the first functional layer located outwardly of the shaft, wherein the ionically conductive elastic layer consists essentially of a rubber composition free of any electron-conductive agent and containing 0.7 to 1.0 parts by weight of a peroxide cross-linking agent per 100 parts by weight of an ion-conductive rubber, the ion-conductive rubber being formed of a nitrile rubber, wherein a percentage of a rubber component in the ionically conductive elastic layer measured by thermogravimetric analysis is 90% or more by weight, and wherein the rubber composition further contains 1 to 2 parts by weight of an ion-conductive agent per 100 parts by weight of the nitrile rubber.

* * * * *